United States Patent
Bronner

(10) Patent No.: US 7,415,803 B2
(45) Date of Patent: Aug. 26, 2008

(54) DOUBLE-WING WING NUT ANCHOR SYSTEM AND METHOD

(76) Inventor: Joseph Bronner, 36 Copeland Rd., Denville, NJ (US) 07834

( * ) Notice: Subject to any disclaimer, the term of this patent is extended or adjusted under 35 U.S.C. 154(b) by 267 days.

(21) Appl. No.: 11/143,037

(22) Filed: Jun. 2, 2005

(65) Prior Publication Data

US 2005/0279042 A1 Dec. 22, 2005

Related U.S. Application Data

(60) Provisional application No. 60/581,039, filed on Jun. 18, 2004, provisional application No. 60/628,048, filed on Nov. 15, 2004, provisional application No. 60/628,047, filed on Nov. 15, 2004.

(51) Int. Cl.
*E04B 1/16* (2006.01)
(52) U.S. Cl. .............................. 52/378; 52/377; 52/379; 52/383; 52/506.1; 52/513; 52/512; 52/508; 52/713
(58) Field of Classification Search ........... 52/377–379, 52/383, 506.01, 513, 512, 508, 713
See application file for complete search history.

(56) References Cited

U.S. PATENT DOCUMENTS

| | | |
|---|---|---|
| 1,392,703 A | 10/1921 | Phillips |
| 1,798,468 A | 3/1931 | Hartzler et al. |
| 1,854,633 A | 4/1932 | Stephens |
| 1,942,863 A | 1/1934 | Johnstone |
| 2,240,117 A | 4/1941 | Homolya |
| 2,280,647 A | 4/1942 | Hawes |
| 2,403,566 A | 7/1946 | Thorp et al. |
| 2,580,330 A | 12/1951 | Symons |
| 2,948,045 A | 8/1960 | Imonetti |

(Continued)

FOREIGN PATENT DOCUMENTS

DE 231696 6/1909

(Continued)

OTHER PUBLICATIONS www.heckmanbuildingprods.com.*

(Continued)

*Primary Examiner*—Jeanette E. Chapman
*Assistant Examiner*—Daniel Kenny
(74) *Attorney, Agent, or Firm*—McCracken & Frank LLP

(57) ABSTRACT

A system includes a back up wall and a veneer wall spaced from the back up wall. An anchor shaft has a first end secured to the back up wall, and a second free end of the shaft projects into a space between the back up wall and the veneer wall. A wing nut has a central barrel disposed on the shaft proximate the free end. The wing nut is spaced apart from a surface of the back up wall. A first generally planar side wing extends laterally from the central barrel of the wing nut. A second generally planar side wing extends laterally from the central barrel. The first side wing includes a first opening for receipt of a first wire tie leg, and the second side wing includes a second opening for receipt of a second wire tie leg. The wing nut is independently rotatable relative to the shaft to angularly orient the wings and thus the openings as desired.

13 Claims, 10 Drawing Sheets

U.S. PATENT DOCUMENTS

| | | | |
|---|---|---|---|
| 2,999,571 A | 9/1961 | Huber | |
| 3,292,336 A | 12/1966 | Brynjolfsson et al. | |
| 3,341,998 A | 9/1967 | Lucas | |
| 3,353,312 A | 11/1967 | Storch | |
| 3,500,713 A | 3/1970 | Bell | |
| 3,523,395 A | 8/1970 | Rutter et al. | |
| 3,587,198 A | 6/1971 | Hensel | 52/741 |
| 3,707,815 A | 1/1973 | Molyneux | 52/713 |
| 3,786,605 A * | 1/1974 | Winfrey | 52/235 |
| 4,002,001 A | 1/1977 | Uydess | 52/731 |
| 4,021,990 A | 5/1977 | Schwalberg | 52/714 |
| 4,107,890 A | 8/1978 | Seghezzi et al. | 52/379 |
| 4,108,560 A | 8/1978 | Minogue | 403/33 |
| 4,329,823 A | 5/1982 | Simpson | 52/407 |
| 4,350,464 A | 9/1982 | Brothers | 411/180 |
| 4,422,617 A | 12/1983 | Gallis | 249/19 |
| 4,426,061 A | 1/1984 | Taggart | 249/85 |
| 4,430,035 A | 2/1984 | Rodseth | 411/402 |
| 4,473,209 A | 9/1984 | Gallis et al. | 249/191 |
| 4,473,984 A | 10/1984 | Lopez | 52/410 |
| 4,600,344 A * | 7/1986 | Sutenbach et al. | 411/435 |
| 4,606,163 A | 8/1986 | Catani | 52/434 |
| 4,653,244 A | 3/1987 | Farrell | 52/741 |
| 4,680,913 A | 7/1987 | Geisen et al. | 52/746 |
| 4,736,554 A | 4/1988 | Tyler | 52/105 |
| 4,764,069 A | 8/1988 | Reinwall et al. | 411/397 |
| 4,825,614 A | 5/1989 | Bennett et al. | 52/410 |
| 4,869,038 A | 9/1989 | Catani | 52/410 |
| 4,955,172 A | 9/1990 | Pierson | 52/710 |
| 5,207,043 A * | 5/1993 | McGee et al. | 52/379 |
| 5,209,619 A | 5/1993 | Rinderer | 411/85 |
| 5,347,781 A | 9/1994 | Hanlon | 52/379 |
| 5,392,581 A | 2/1995 | Hatzinikolas et al. | 52/712 |
| 5,456,052 A | 10/1995 | Anderson et al. | 52/713 |
| 5,671,578 A | 9/1997 | Hohmann | 52/562 |
| RE35,659 E | 11/1997 | Ernst et al. | 411/82 |
| 5,816,008 A | 10/1998 | Hohmann | 52/565 |
| 5,836,126 A | 11/1998 | Harkenrider | 52/410 |
| D406,524 S | 3/1999 | Steenson et al. | D8/397 |
| 6,128,883 A | 10/2000 | Hatzinikolas | 52/698 |
| 6,131,360 A | 10/2000 | Dalen | 52/712 |
| 6,209,281 B1 | 4/2001 | Rice | 52/714 |
| 6,279,283 B1 | 8/2001 | Hohmann et al. | 52/379 |
| 6,332,300 B1 | 12/2001 | Wakai | 52/713 |
| 6,401,406 B1 | 6/2002 | Komora | 52/127.3 |
| 6,502,362 B1 | 1/2003 | Zambelli et al. | 52/698 |
| 6,763,640 B2 | 7/2004 | Lane | 52/300 |
| 6,802,675 B2 | 10/2004 | Timmons et al. | 405/284 |
| 2003/0145543 A1 | 8/2003 | Lane | 52/314 |
| 2004/0216416 A1 | 11/2004 | Hohmann et al. | 52/513 |
| 2005/0025606 A1 | 2/2005 | Toosky | 411/181 |
| 2005/0097849 A1 | 5/2005 | Hayes | 52/698 |

FOREIGN PATENT DOCUMENTS

| | | |
|---|---|---|
| DE | 1960453 | 6/1970 |
| DE | 2856205 | 10/1980 |

OTHER PUBLICATIONS

Brochure distributed less than one year before the filing date of present application.

* cited by examiner

DOUBLE-WING WING NUT ANCHOR SYSTEM AND METHOD

CROSS REFERENCE TO RELATED APPLICATIONS

The present application claims priority to and benefit of: U.S. Provisional Patent Application Ser. No. 60/581,039, filed Jun. 18, 2004; U.S. Provisional Patent Application Ser. No. 60/628,048, filed Nov. 15, 2004; and U.S. Provisional Patent Application Ser. No. 60/628,047, filed Nov. 15, 2004. The disclosures of these applications are incorporated herein by reference in their entireties for all purposes.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to apparatus for transferring horizontal loads between a back up wall and a veneer wall, and, more particularly, to a wing nut connecting an anchor shaft extending from the back up wall or other building support to a wire tie extending from a veneer wall.

2. Description of the Background of the Invention

Various patents disclose apparatus for connecting a back up wall to a veneer wall for transferring horizontal loads therebetween.

Reinwall et al. U.S. Pat. No. 4,764,069 discloses a threaded stud drilled into a supportive metal stud wall. The stud has an elongate barrel integral with a driving head. The barrel may include cutting elements for cutting through an insulation layer and any sheeting on the supportive wall. The stud is driven until the barrel abuts the supportive wall. The driving head of the stud/barrel includes an elongate eye for receipt of a wire tie that extends from a mortar bed of a veneer wall. The driving head also includes a circumferential flange disposed between the barrel and the eye and sized larger than the barrel. The flange seals against the insulation layer.

Lopez U.S. Pat. No. 4,473,984 discloses a threaded stud having a fastener barrel rigidly secured on an end of the threaded stud. The fastener barrel includes a slot through which a wire tie is looped. The stud is driven into the back up wall by rotating the fastener barrel, typically with a drill having a chuck that fits around a portion of the fastener barrel. The fastener barrel may include teeth for cutting through insulation and any backup wall sheeting as the threaded stud is driven through insulation and the back up wall.

Various patents show fastening apparatus. Holaday U.S. Pat. No. 1,289,450 shows a pressure screw having a shaft and a handle. The handle has first and second wings, and each of the wings has an opening.

Larava U.S. Pat. No. 1,044,791 shows a thumb nut formed of sheet metal. The thumb nut has first and second wings with an opening in each wing.

Schmidt et al. U.S. Design Pat. No. 123,423 discloses a wing nut having a fastening portion and a handle portion. Similarly, Bethea U.S. Design Pat. No. 286,979 and Bethea U.S. Design Pat. No. 286,744 show nuts having fastening and handle portions.

Roerig U.S. Pat. No. 2,576,643 shows a wing nut, each wing having an opening therethrough.

SUMMARY OF THE INVENTION

In accordance with one aspect of the present invention, a system includes a back up wall and a veneer wall spaced from the back up wall. An anchor shaft has a first end secured to the back up wall, and a second free end of the shaft projects into a space between the back up wall and the veneer wall. A wing nut has a central barrel disposed on the shaft proximate the free end. The wing nut is spaced apart from a surface of the back up wall. A first generally planar side wing extends laterally from the central barrel of the wing nut. A second generally planar side wing extends laterally from the central barrel. The first side wing includes a first opening for receipt of a first wire tie leg, and the second side wing includes a second opening for receipt of a second wire tie leg. The wing nut is independently rotatable relative to the shaft to angularly orient the wings and thus the openings as desired.

In accordance with a further aspect of the present invention, a method of anchoring a veneer wall to a back up wall for horizontal load transfer therebetween includes the step of securing a first end of an anchor shaft to a building support such that a second free end of the shaft protrudes into a space between the building support and the veneer wall. A wing nut is selected having a central barrel and first and second generally planar side wings extending laterally from the central barrel. The first wing defines a first opening therethrough for receipt of a first wire tie leg. The second wing defines a second opening therethrough for receipt of a second wire tie leg. The wing nut is disposed on the shaft such that the shaft is in the central barrel and the wing nut is spaced from a surface of the building support. The wing nut is rotated to a desired angular position. First and second wire tie legs are placed into the first and second respective openings.

In accordance with yet another aspect of the present invention, a method of providing a wing nut to an end user for connecting a back up wall to a veneer wall includes the step of providing a wing nut having a central barrel with a bore sized to accommodate an anchor shaft and first and second wings extending from the barrel, each of the wings having a through hole sized to accommodate a wire tie leg. The end user is informed that the wing nut is usable with the wire tie and the anchor shaft for the purpose of connecting a back up wall to a veneer wall. The wing nut is delivered to the end user so that the end user places the wire tie legs into the through holes to connect the back up wall to the veneer wall.

BRIEF DESCRIPTION OF THE DRAWINGS

FIG. 2 is an elevational view of an anchor shaft which the wing nut of FIG. 1A may be placed on;

FIG. 3 is an exploded elevational view of a shaft which the wing nut of FIG. 1B may be placed on;

DETAILED DESCRIPTION OF THE PREFERRED EMBODIMENTS

Figure 1A:
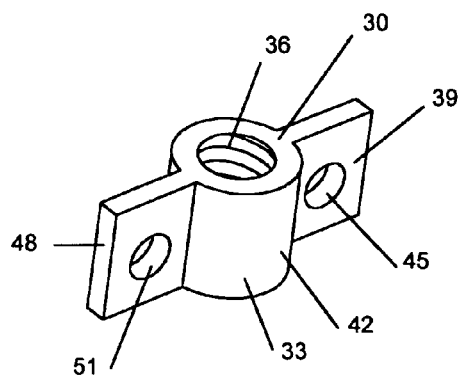
FIG. 1A is an isometric view of a first wing nut having a threaded bore.
Figure 1B:
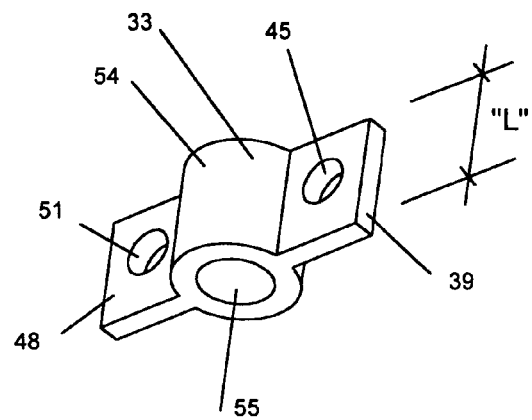
FIG. 1B is an isometric view of a second wing nut having a non-threaded bore.

Referring to FIG. 1A, a wire tie receiving body or wing nut 30 includes a central barrel 33 having an internal threaded bore 36. The bore 36 could be either partially or fully threaded. A generally planar first wing 39 extends laterally from an external side surface 42 of the barrel 33, and the first wing 39 includes a through hole or opening 45 through which a wire tie leg (shown in subsequent drawings) may extend. A generally planar second wing 48, similar or identical to the first wing 39, extends laterally from the barrel 33 and includes an opening 51. The openings 45, 51 may be circular. The wings 39 and 48 may be circumferentially spaced apart by any suitable amount, such as approximately 180 degrees. It should be noted, however, that other spacing may be possible and that the barrel 33, while generally illustrated as circumferential, could instead be made square or any other shape if desired. The wing nut 30 may be constructed of any suitable material such as galvanized steel, stainless steel, metal alloys such as zinc alloys, plastics, etc. Referring to FIG. 1B, a second embodiment of wing nut 54 could include a non-threaded bore 55. The wing nut 54 could be otherwise similar or identical to the wing nut 30.

Figure 2:
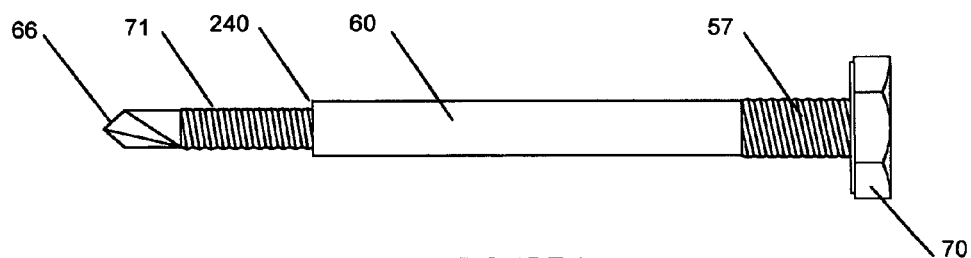
Figure 3:
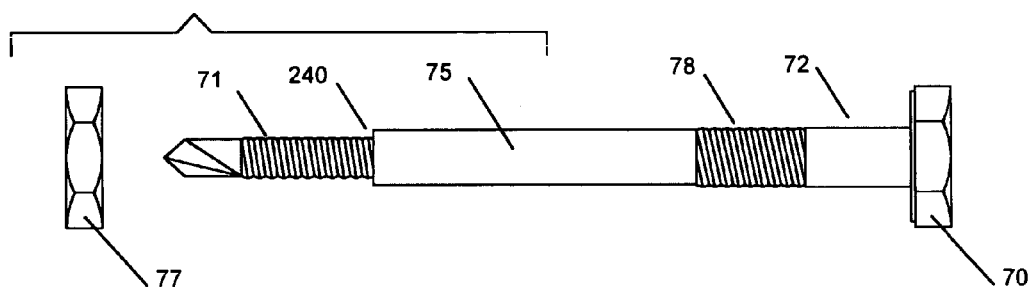
Figure 4:
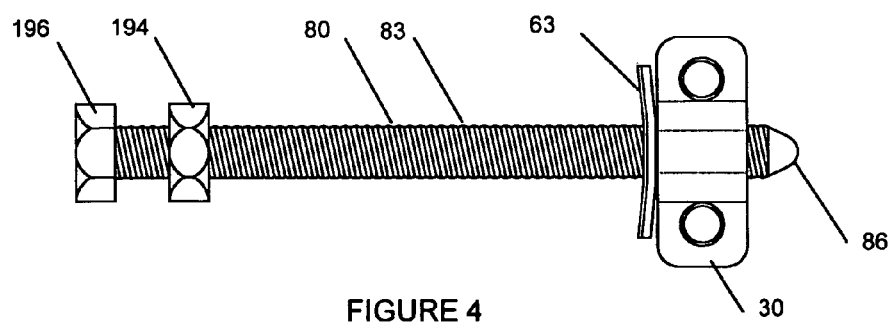
FIG. 4 is an elevational view of the wing nut of FIG. 1A disposed on a third embodiment of anchor shaft.
Figure 5:
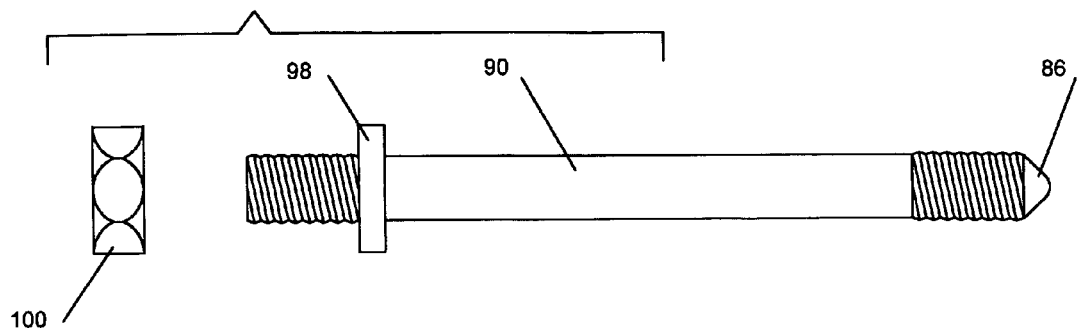
FIG. 5 is an exploded elevational view of an anchor shaft having a collar.
Figure 6:
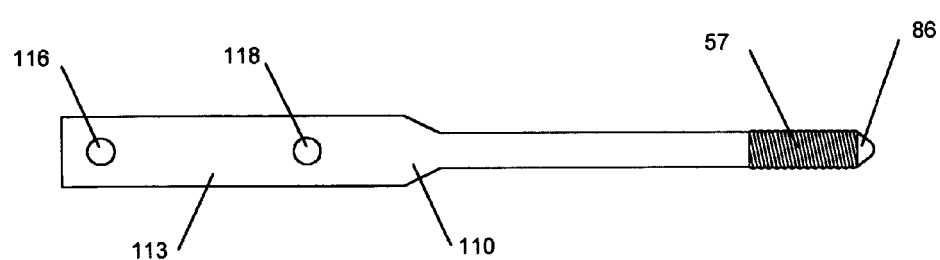
FIG. 6 is an elevational view of a further embodiment of an anchor shaft.
Figure 7A:
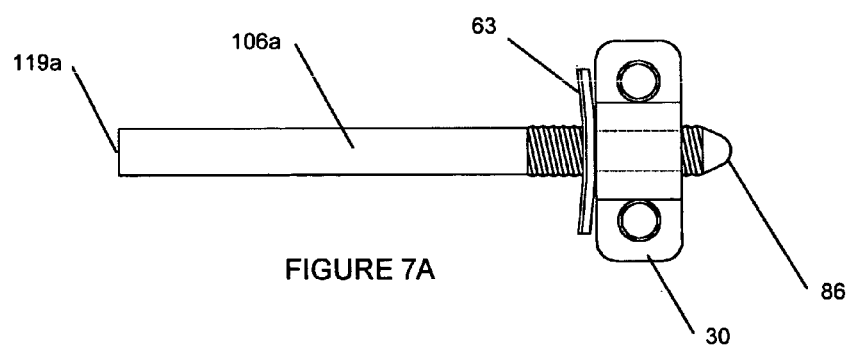
FIG. 7A is an elevational view showing a shaft that may be welded to a back up wall reinforcement.
Figure 7B:
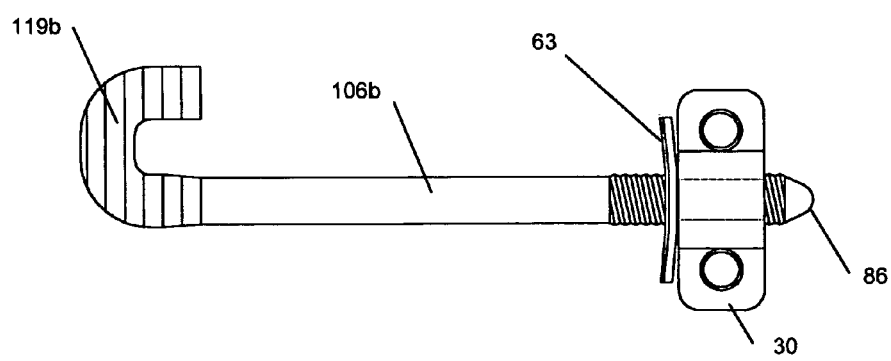
FIG. 7B is an elevational view showing a shaft having a flat curved end.

Referring to FIG. 2, the wing nut 30 may be threaded onto a threaded region 57 of an anchor shaft 60. Optionally, one or more washers 63 (FIG. 4) may be disposed on the shaft 60 as well. The position of the wing nut 30 along the longitudinal axis of the shaft 60 may be changed by rotating the wing nut 30 along the threaded region 57 in a direction either toward or away from a tip 66 of the shaft 60. Rotation of the wing nut 30 may be accomplished either manually or with the assistance of an appropriate tool. Rotation of the wing nut 30 not only affects the longitudinal positioning of the wing nut 30, but also affects the angular orientation of the wing nut 30 and thus the planar wings 39 and 48. The size, number, and spacing of the threads of the wing nut 30 and the threaded region 57 may be designed as desired so that the wing nut 30 may have any desired resistance to rotation. The shaft 60 includes a driving head 70, and a screw end portion 71 having a smaller diameter than the shaft 60. The threaded portion 71 and tip 66 are suited for the particular back up wall into which the shaft 60 is fastened, and the method of fastening such as self drilling, self tapping, screwing into pre drilled holes, etc. Referring to FIG. 3, the non-threaded wing nut 54 could be placed on a non-threaded region 72 of a shaft 75, which is preferably of larger diameter than the rest of the shaft 75. A nut 77 is then threaded onto a threaded region 78 to capture the wing nut 54 between the nut 77 and the driving head 70. The wing nut 54 is preferably capable of rotational movement about the longitudinal axis of the shaft 75, despite the wing nut 54 being captured between the nut 77 and the driving head 70. Referring to FIG. 4, the wing nut 30 could be disposed on a shaft 80 having a threaded region 83 that extends all the way to a tip 86 of the shaft 80. Referring to FIG. 5, a shaft 90 could include an integral collar 98, and a threaded nut 100 could capture a portion of the back up wall between the nut 100 and the collar 98. Referring to FIG. 6, a further shaft 110 could include a planar portion 113 having screw holes 116, 118. Referring to FIG. 7A, a shaft 106a could include an unremarkable cylindrical end 119a that may be welded to a back up wall reinforcement (not shown) as will be appreciated hereinafter. Referring to FIG. 7B, an alternative shaft 106b includes a hook end 119b that can be flattened and welded to a back up wall reinforcement or could hook around same.

Figure 8:
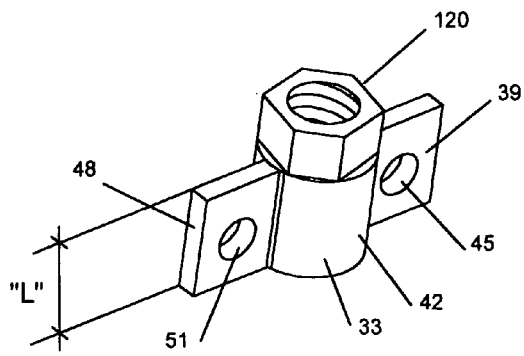
FIG. 8 is an isometric view of a wing nut having a driving hex head extension welded, joined to, or integral with the wing nut.

Referring to FIG. 8, the wing nut 30 or 54 could be modified by adding a driving hex head extension 120 that may fit within a socket of a hand or power tool to facilitate rotating the nut 30 or 54. Referring to FIG. 8A, while the wing nut 30 and 54 of FIGS. 1A and 1B are shown as unitary monolithic structures, a two-part construction may be possible where the barrel 33, typically a nut 129, is disposed within a clip 130, such that the nut 129 is preferably restrained from rotational movement therewithin. Opposed walls 131, 132 include aligned openings 131a, 132a that align with the bore 36 or 55 of the barrel 33. The clip 130 may include generally planar wings 133, 136, similar or identical to the wings 39 and 48. The assembled barrel 33 and clip 130 may function in like manner to the wing nut 30 or 54.

Figure 8C:
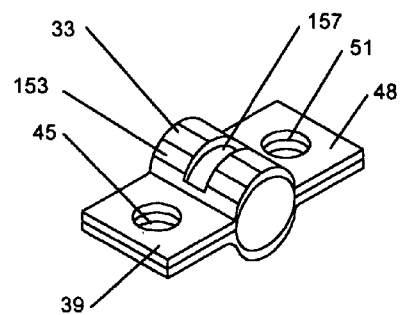
FIG. 8C is an isometric view of a wing nut having a slot.
Figure 8A:
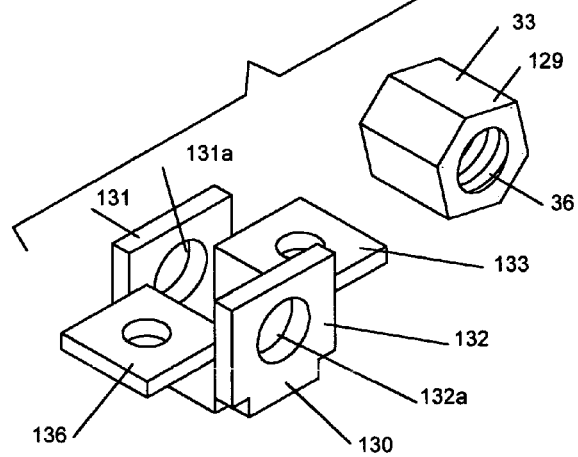
FIG. 8A is an exploded isometric view of a barrel and a clip in which the barrel may be disposed.
Figure 8D:
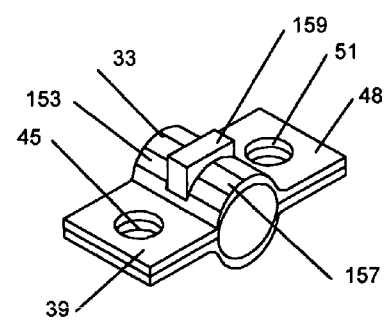
FIG. 8D shows the wing nut of FIG. 8C with a nut disposed in the slot.
Figure 8B:
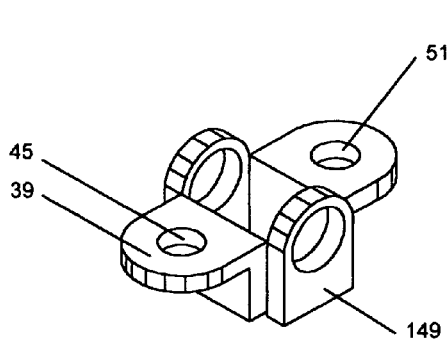
FIG. 8B is an isometric view of a clip having rounded edges.

Referring to FIG. 8B, an alternative clip 149 could have a more rounded shape than the clip 130 of FIG. 8A.

FIG. 8C shows a clip 153 having a slot 157 for receipt of a nut 159 shown in FIG. 8D. The nut 159 will be held in place by insertion of a suitable shaft through the clip 153 and through the nut 159, such as one of the shafts shown above. The clip 153 could be made of two bent plates, or alternatively one folded bent plate.

Figure 9:
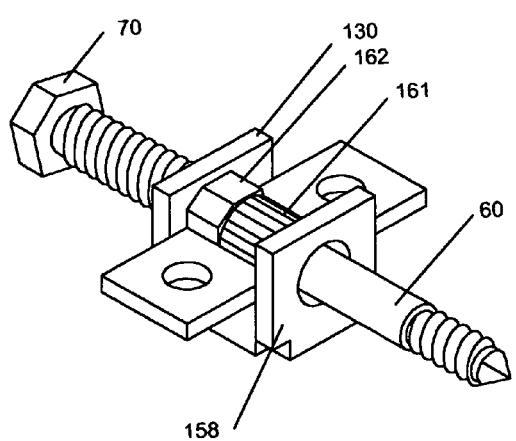
FIG. 9 is an isometric view of a further embodiment of wing nut with the shaft inserted.

FIG. 9 shows the clip 130, one or more spacer washers 161, a nut 162, and the shaft 60 disposed through the nut 162. It may be cheaper in some instances to use one or more spacer washers 161, given that the nut 162 could be made smaller, thereby reducing cost relative to cost of the nut 129.

Referring again to FIG. 1B, the barrel 33 has an axial extent. A length L of the wings 39, 48, 133, 136 could be similar or identical to the axial extent of the barrel 33. Alternatively, the length L could be shorter or longer than the axial extent of the barrel 33 as desired.

Figure 10:
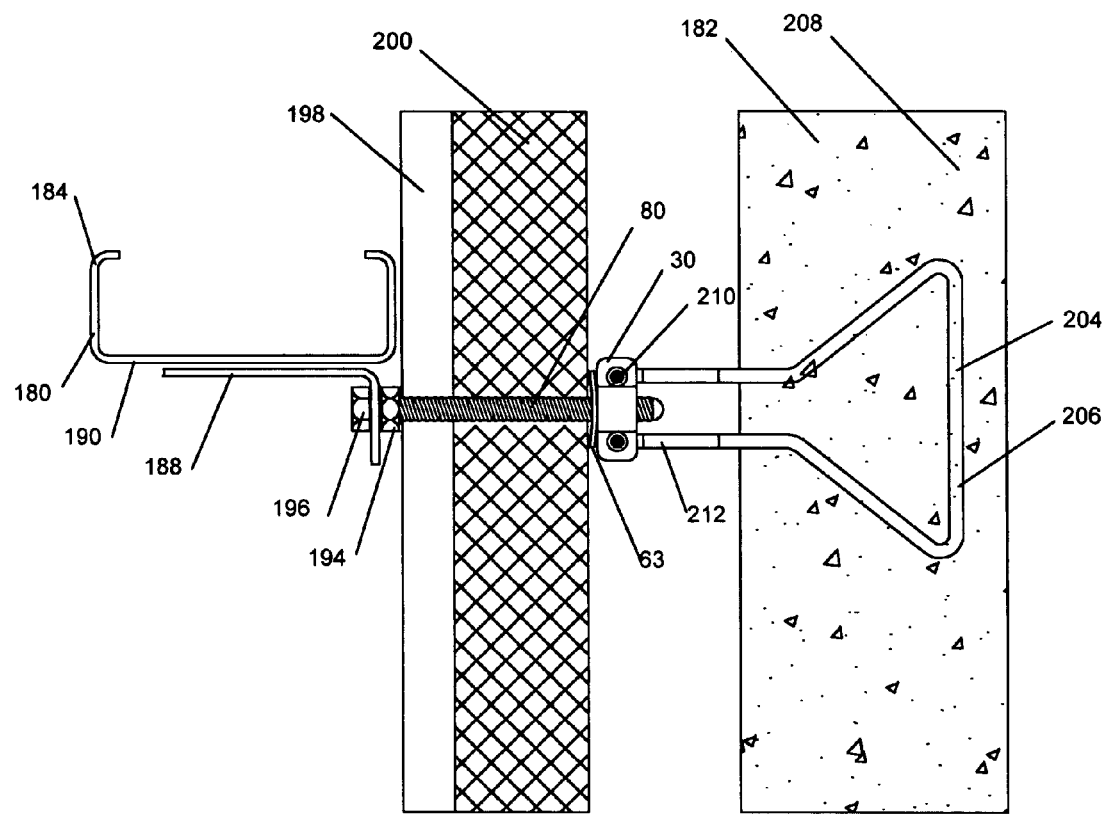
FIG. 10 is a fragmentary elevational view, partly in section, looking up from below on a wing nut in use.
Figure 11:
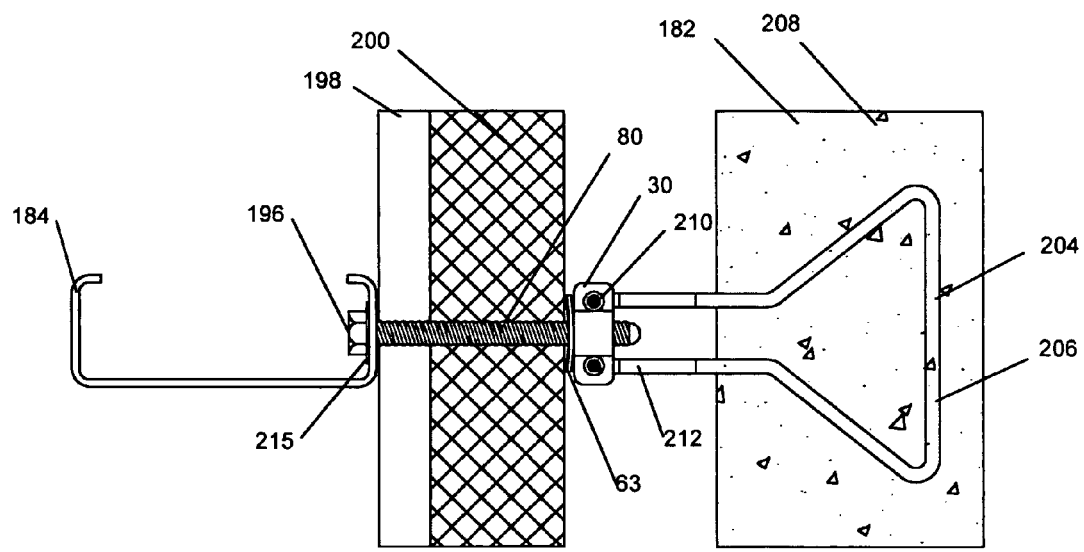
FIG. 11 is a fragmentary elevational view illustrating a modified arrangement to that shown in FIG. 10.
Figure 12A:
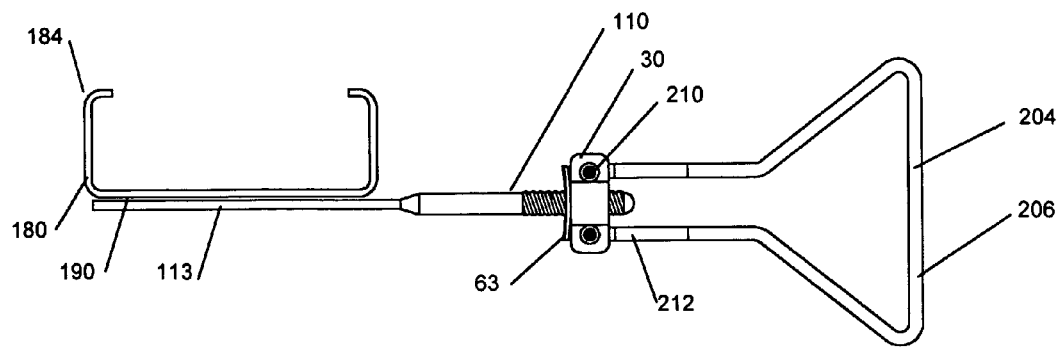
FIG. 12A-C are elevational views showing various anchor shaft arrangements, with the veneer wall omitted for simplicity.
Figure 12B:
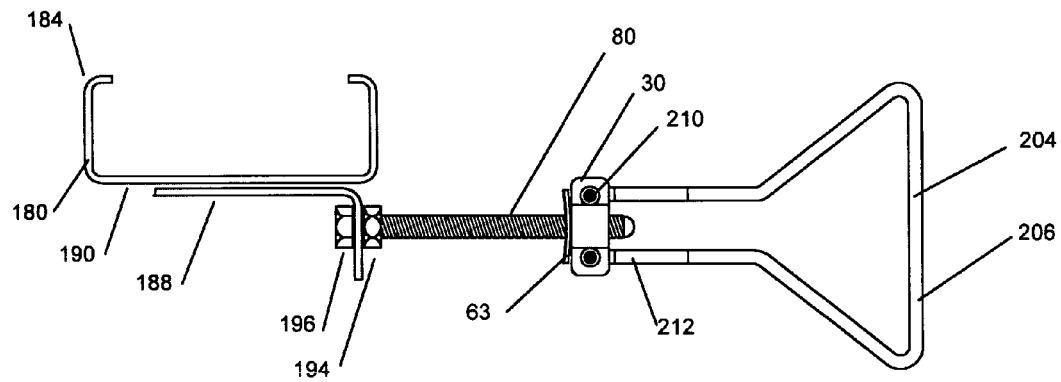
Figure 12C:
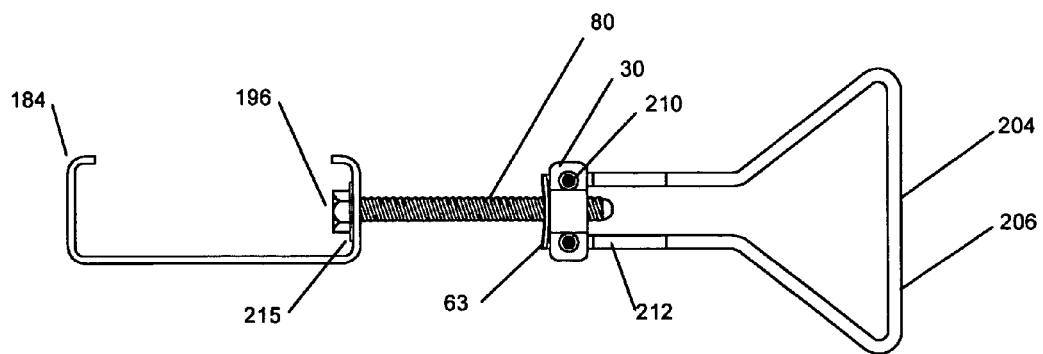
Figure 13:
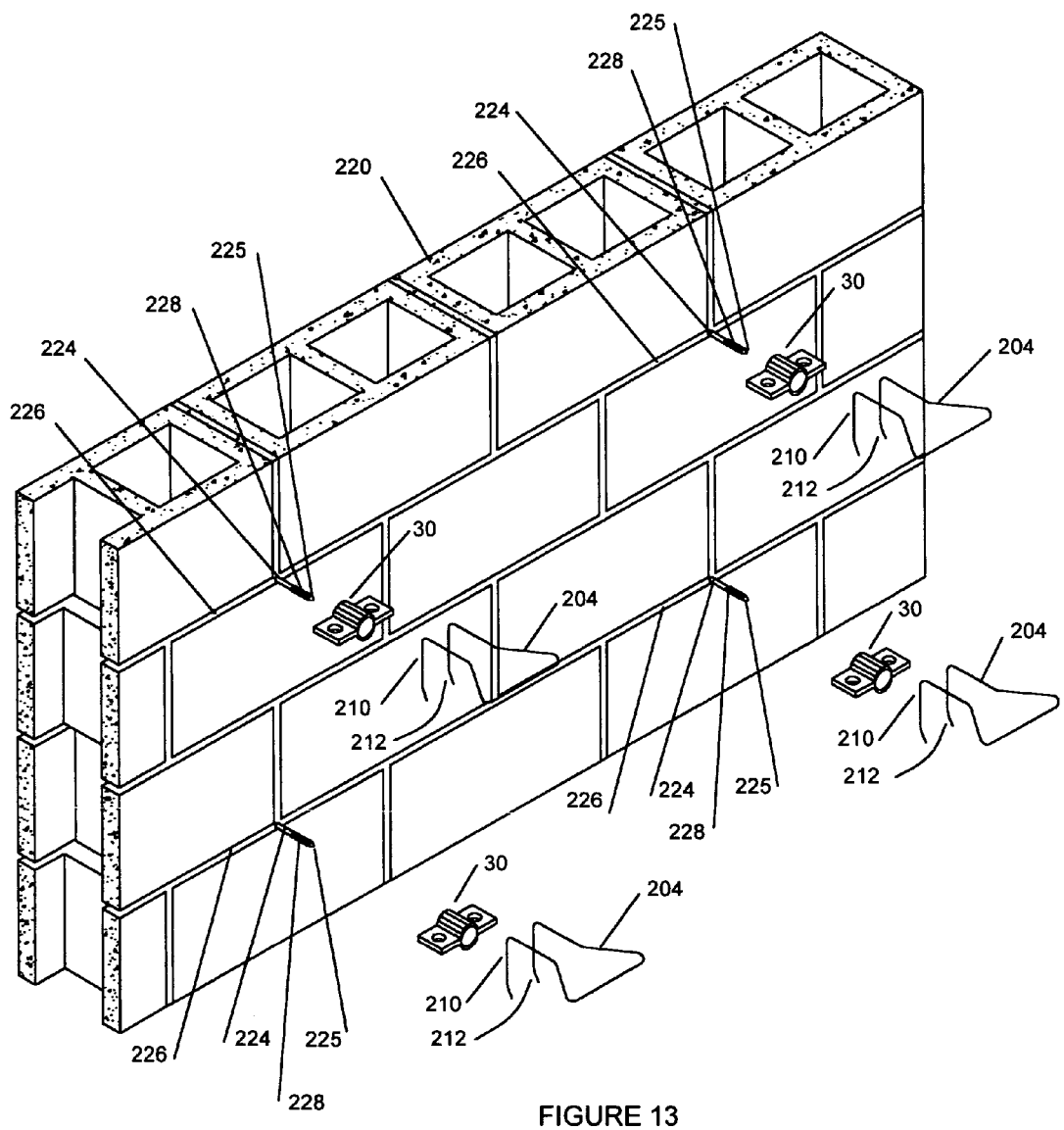
FIG. 13 is an exploded isometric view showing a block back up wall along with wire ties and wing nuts, with the veneer wall omitted for simplicity.

Referring to FIG. 10, the wing nut 30 is shown connecting a back up wall 180 to a veneer wall 182 for transfer of horizontal forces between the back up wall 180 and the veneer wall 182. As used throughout, "back up wall" means any building support structure or wall whether such back up wall consists of or comprises a metal frame, concrete, masonry blocks, wood frame or combinations thereof, etc. In FIG. 10, the back up wall 180 is illustrated as a metal stud 184. An L-shaped plate 188 is screwed, welded or otherwise secured to a surface 190 of the stud 184. The shaft 80 is in turn secured to the plate 188 in any suitable manner such as by a threaded nut 194 threaded to the shaft 80 and capturing a portion of the plate 188 between the nut 194 and a head 196 of the shaft 80. The shaft 80 may extend through one or more layers of wall sheeting 198 such as gypsum board, if present, and may also extend through one or more layers of insulation 200, if present. The wing nut 30 is threaded onto the shaft 80 and rotated in a direction to tighten the wing nut 30 against the insulation 200. The optional washer 63 may be disposed between the insulation 200 and the wing nut 30 to seal the bore through the insulation 200 created from boring the shaft 80 through the insulation 200. It should be noted that instead of having the washer 63, one could alternatively provide the wing nut 30 with a suitable circumferential flange. The washer 63 may be formed of an elastomeric material to provide a substantially waterproof or at least water-resistant seal. The washer 63 may also be formed of metal with a layer of rubber or other elastomeric and/or water sealing material. A double-legged pintle-style wire tie 204 includes an embedment portion 206 disposed in a mortar bed 208 of the veneer wall 182. Legs 210, 212 (seen also in FIG. 13) of the wire tie 204 are disposed in the openings 45 and 51 of the wing nut 30. As shown in FIG. 13, ends of the legs 210, 212 may be slightly bent to inhibit the legs 210, 212 from sliding out of the wing nut 30 once installed therein. Referring to FIG. 11, in an alternative arrangement, the plate 188 is omitted and the shaft 80 extends through a through hole in the metal stud 184. A suitable locking washer 215 may optionally be positioned between the head 196 of the shaft 80 and the metal stud 184. FIGS. 12A-12C compare various arrangements side by side. FIG. 12A shows the shaft 110 of FIG. 6. FIGS. 12B and 12C show the arrangements of FIGS. 10 and 11, respectively.

Referring to FIG. 13, an alternative back up wall 220 could be a masonry block wall with masonry anchor shafts 224 embedded in mortar beds 226 of the block wall 220 in any suitable manner. Alternatively, instead of embedding the shafts 224 in mortar beds, one could have a poured concrete wall (not shown) where the shafts 224 would be embedded in such wall by pouring concrete around the shafts 224 during formation of such wall. The wing nut 30 is threaded onto a threaded region 228 of the shafts 224. The legs 210, 212 are positioned within the openings 45, 51 once the wing nuts 30 are assembled on the shafts 224. Prior to threading the wing nuts 30 onto the shafts 224, one may press one or more layers of insulation (not shown) against the shafts 224 such that the threaded regions 228 stick through such insulation. Alternatively, rather than piercing the insulation or gypsum board one could provide sheets of insulation or gypsum that are placed between the shafts 224. Ends 225 of the shafts 224 could be made pointed to facilitate piercing of such wall sheeting and/or insulation. Alternatively, the shaft ends 225 may be rounded as shown in other figures (e.g., FIG. 4). As a further alternative, the ends 225 may be blunt. Washers (not shown) may be placed on the shafts 224 prior to wing nut 30 installation.

Figure 14:
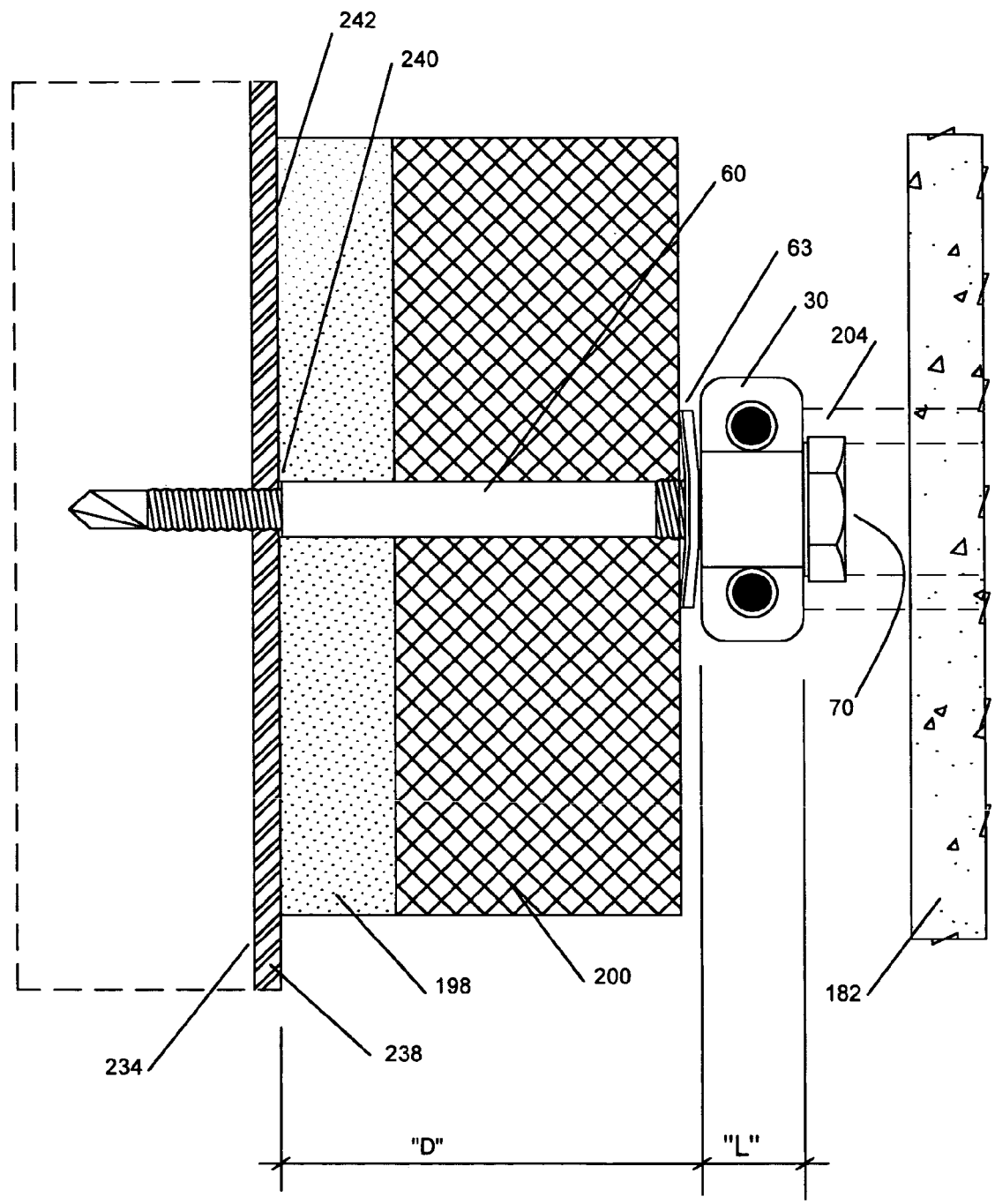
FIG. 14 is a fragmentary elevational view, partly in section, showing an anchor shaft drilled into a metal stud wall.
Figure 14A:
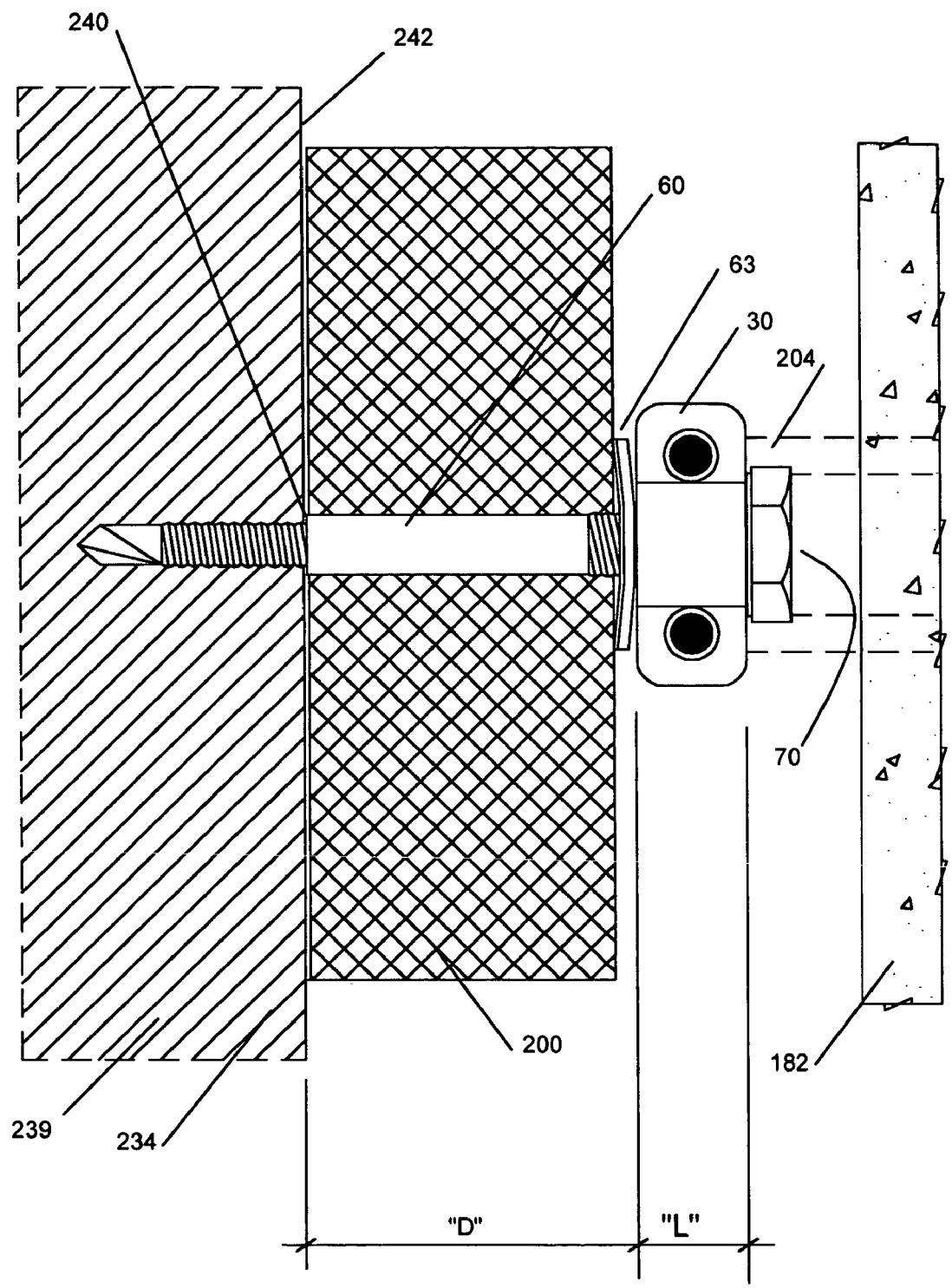
FIG. 14A is a view similar to FIG. 14, but showing the anchor drilled into a masonry wall.
Figure 15:
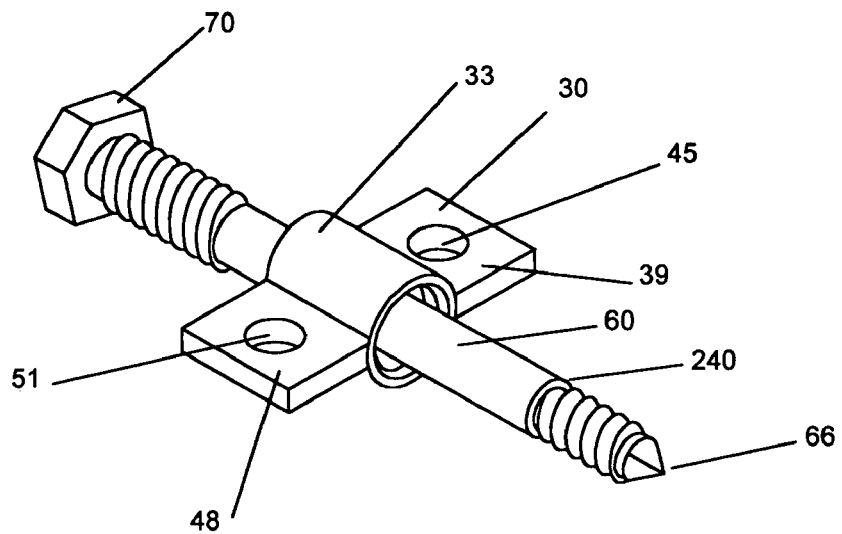
FIG. 15 is an isometric view showing the wing nut and shaft of FIG. 14.
Figure 15A:
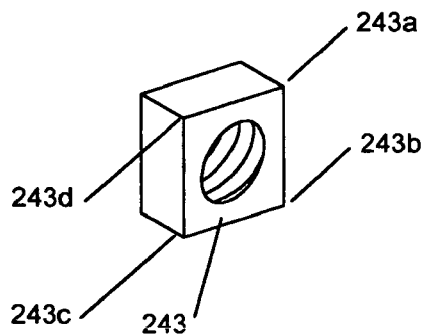
FIG. 15A is an isometric view of an optional square drilling nut that may be provided on the shaft.
Figure 16:
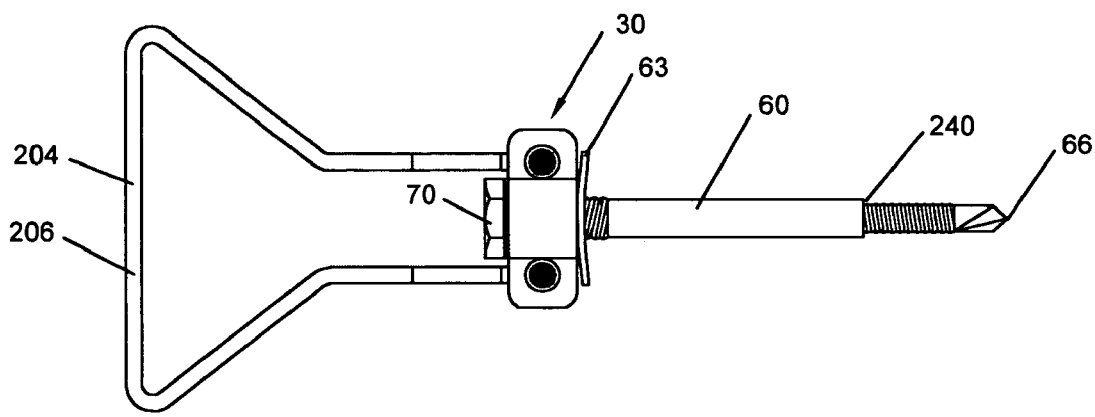
FIG. 16 is an elevational view showing components of FIG. 15 with a wire tie.
Figure 17:
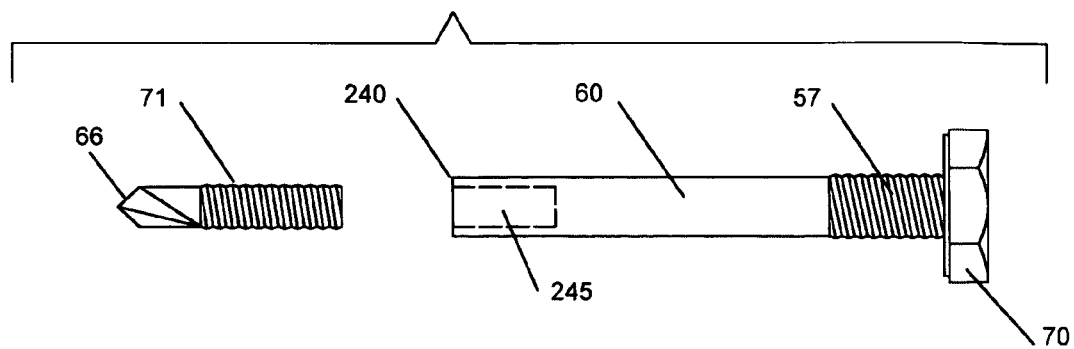
FIG. 17 is an exploded elevational view showing a two-piece shaft.
Figure 18:
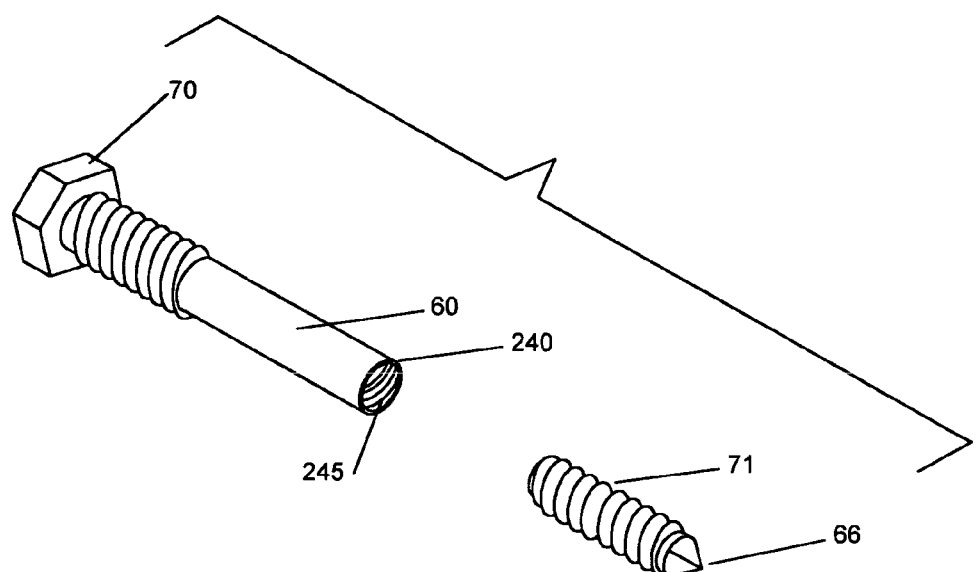
FIG. 18 is an exploded isometric view of the shaft of FIG. 17.

Referring to FIG. 14, the shaft 60 (FIG. 2, 15) may be drilled into a back up wall 234, such as a metal stud wall 238. If a shaft is drilled into a concrete block wall, one may typically pre-dill such wall before drilling the shaft into the wall. However, if a shaft, such as the shaft 60, is drilled into a metal stud wall, such shaft is typically self-drilling. Referring to FIG. 14A, the shaft 60 could be drilled into a masonry wall 239. The shaft 60 is drilled into the wall 238 until a shoulder surface 240 of the shaft 60 engages a surface 242 the wall 238. The shoulder 240 could optionally include ridges or teeth (not shown) to facilitate boring through the gypsum board and insulation and/or to enhance engagement of the shoulder 240 into the surface 242. Referring to FIG. 15A, instead of providing teeth, a square nut 243 could be disposed on the portion 71, tightened against the shoulder 240, and edges 243a-243d could facilitate cutting through insulation and gypsum board. The shaft 60 is driven by rotating the head 70 of the shaft 60 with an appropriate power tool (not shown). During driving of the shaft 60, the wing nut 30 is preferably disposed on the shaft 60. As a further alternative, FIGS. 17 and 18 show that a two-piece shaft design is possible in which the screw end portion 71 is threaded into a threaded bore 245. One could potentially make all or part of the shaft 60 out of a suitable plastic, but make the screw end portion 71 out of steel.

Referring again to FIG. 14, a dimension or distance D is defined roughly between the surface 242 of the back up wall 234 and the wing nut 30, typically roughly equal to the thickness of the insulation and sheeting. The wing nut 30 includes a length dimension L measured parallel to the dimension D. D may have any value. For example, D may be roughly equal to L or greater than L. The distance D may be dependent upon the thickness of insulation and/or other wall sheeting disposed between the surface 242 of the back up wall 234 and the wing nut 30. From the various illustrations, it should be evident that the wing nut 30 can be used with a variety of shafts having a variety of lengths and attached to a variety of back up walls in a variety of ways. In this regard, the wing nut 30 or 54 is generally designed for use with a first type of shaft embedded in a back up wall or a second type of shaft that is drilled, screwed, or otherwise secured to a back up wall. It should be readily appreciated that a building designer could modify the thickness of the wall sheeting 198 and/or insulation 200 shown in FIG. 14 and that a contractor need only purchase a longer or shorter shaft to accommodate different thicknesses, yet may still use the same wing nut. The wing nut 30 is preferably tightened against the insulation 200, if present, or against sheeting 198 if no insulation is present. The wing nut 30 is rotated until the washer 63 and/or the wing nut 30 provide a desired minimum pressure against the insulation 200 or the sheeting 198. The wing nut 30 might be rotated further, typically in a tightening direction, until the wings 39, 48 have a desired angular orientation. For example, one might rotate the wing nut 30 until the wings 39, 48 are horizontal, i.e., generally parallel to the surface of the earth. Of course, one might choose to orient the wings 39, 48 at an angle to horizontal.

In accordance with a further method of the present invention, a vendor, whether a manufacturer, distributor, retailer, or other vendor may provide the wing nut 30 or 54 to an end user so that the end user may use the wing nut 30 or 54 to connect a back up wall to a veneer wall. The vendor provides the wing nut 30 or 54 having the wings 39, 48 and the openings 45, 51. The vendor identifies to the end user that the wing nut 30 or 54 is usable with a wire tie and anchor shaft for the purpose of connecting a back up wall to a veneer wall. The vendor may even sell the wing nut 30 or 54 with a shaft or even on a shaft. This identification can be accomplished in a variety of ways.

For example, the vendor may provide brochures to customers showing the wing nut in a manner that would cause users to purchase the wing nut to use with a wire tie to connect walls. The vendor may distribute pictorial diagrams, either with the brochures or on packaging for the wing nuts. The pictorial diagrams illustrate the wing nut either with a wire tie or with a wire tie and a back up wall and/or veneer wall. The vendor may contact by telephone, email, or other means to inform end users that the wing nut 30 or 54 may be so used.

Numerous modifications to the features described and shown are possible. Accordingly, the described and illustrated embodiments are to be construed as merely examplary of the inventive concepts expressed herein and addressed in the appended claims.

I claim:

1. A system, comprising:
    a back up wall;
    a veneer wall spaced from the back up wall;
    an anchor shaft having a first end secured to the back up wall and a second free end projecting into a space between the back up wall and the veneer wall;
    a wing nut having a central barrel disposed on the shaft proximate the free end and wherein the wing nut is spaced apart from a surface of the back up wall; and
    a first generally planar side wing extending laterally from the central barrel of the wing nut and a second generally planar side wing extending laterally from the central barrel wherein the first side wing includes a first opening for receipt of a first wire tie leg and the second side wing includes a second opening for receipt of a second wire tie leg;
    wherein the wing nut is independently rotatable in two directions relative to the shaft to angularly orient the wings and thus the openings as desired; wherein the central barrel of the wing nut defines a length dimension L measured parallel to a longitudinal axis of the shaft between a first end closest to the back up wall and an opposite second end and wherein a distance D measured between the first end and a surface of the back up wall is at least about L.

2. The system of claim 1, wherein the wing nut includes a threaded bore threaded onto a threaded region of the shaft and the wing nut is longitudinally movable along the shaft by rotating the wing nut along the threaded region.

3. The system of claim 1, wherein the generally planar side wing is aligned generally horizontal to the earth's surface.

4. The system of claim 1, wherein insulation is disposed between the wing nut and the surface of the back up wall.

5. The system of claim 1, wherein wall sheeting is disposed between the wing nut and the surface of the back up wall.

6. The system of claim 1, wherein both wall sheeting and insulation are disposed between the wing nut and the back up wall.

7. The system of claim 1, wherein a washer is disposed between the wing nut and the back up wall.

8. The system of claim 1, wherein the back up wall is a metal stud wall and the shaft is screwed thereto.

9. The system of claim 1, wherein the first end of the shaft is drilled into the back up wall.

10. The system of claim 1, wherein the first and second side wings are circumferentially spaced by approximately 180 degrees.

11. A method of anchoring a veneer wall to a back up wall for horizontal load transfer therebetween, the method comprising the steps of:
    securing a first end of an anchor shaft to a building support such that a second free end of the shaft protrudes into a space between the building support and the veneer wall;
    selecting a wing nut having a central barrel, first and second generally planar side wings extending laterally from the central barrel wherein the first wing defines a first opening therethrough for receipt of a first wire tie leg and wherein the second wing defines a second opening therethrough for receipt of a second wire tie leg and wherein the central barrel of the wing nut defines a length dimension L measured parallel to a longitudinal axis of the shaft between a first end closest to the back up wall and an opposite second end and wherein a distance D measured between the first end and a surface of the back up wall is at least about L;
    disposing the wing nut on the shaft such that the shaft is in the central barrel and the wing nut is spaced from a surface of the building support;
    rotating the wing nut, and thus the openings, in a clockwise or counter-clockwise manner to a desired angular position; and
    placing first and second wire tie legs into the first and second respective openings.

12. The method of claim 11, wherein the central barrel includes an internal threaded bore disposed on a threaded region of the shaft and wherein rotation of the wing nut affects the angular orientation of the generally planar wings and also adjusts the longitudinal positioning of the wing nut along the shaft.

13. The method of claim 11, wherein the first end is drilled into the back up wall.

* * * * *